US 6,603,583 B1

(12) United States Patent
Katakura

(10) Patent No.: US 6,603,583 B1
(45) Date of Patent: Aug. 5, 2003

(54) IMAGE READING METHOD AND APPARATUS

(75) Inventor: Kazuhiko Katakura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/334,682

(22) Filed: Jun. 17, 1999

(30) Foreign Application Priority Data

Jun. 18, 1998 (JP) .......................................... 10-171842

(51) Int. Cl.⁷ ................................................. H04N 1/46
(52) U.S. Cl. ....................................... 358/516; 358/509
(58) Field of Search ................................ 358/512, 516, 358/518, 515, 514, 513, 509, 504

(56) References Cited

U.S. PATENT DOCUMENTS 5,099,359 A * 3/1992 Hrycin ........................ 359/587
5,579,131 A * 11/1996 Kusumoto et al. .......... 358/518

FOREIGN PATENT DOCUMENTS

JP 5-7296 1/1993 ............ H04N/1/40
JP 10-75354 3/1998 .......... H04N/1/401

* cited by examiner

Primary Examiner—Cheukfan Lee
(74) Attorney, Agent, or Firm—Sughrue Mion, PLLC

(57) ABSTRACT

An image reading apparatus and method is realized which can obtain light correction data with accurately and without involving a complicated operation. A turret including balance filters for a negative film and for a positive film, respectively, is provided in the image reading apparatus. When light correction data is acquired, the turret is controlled so that the positive-film balance filter is inserted and located on an optical axis L of light emitted from a lamp, and in a state in which a photographic film is not set in a film carrier, light correction data is generated based on image data outputted from a line CCD. At the time of reading images on the photographic film, when a negative film is used as the photographic film, the negative-film balance filter is inserted and located on the optical axis L, and when a positive film is used as the photographic film, the positive-film balance filter is inserted and located on the optical axis L. Further, light correction is performed for image data inputted from the line CCD using the above-described light correction data.

13 Claims, 11 Drawing Sheets

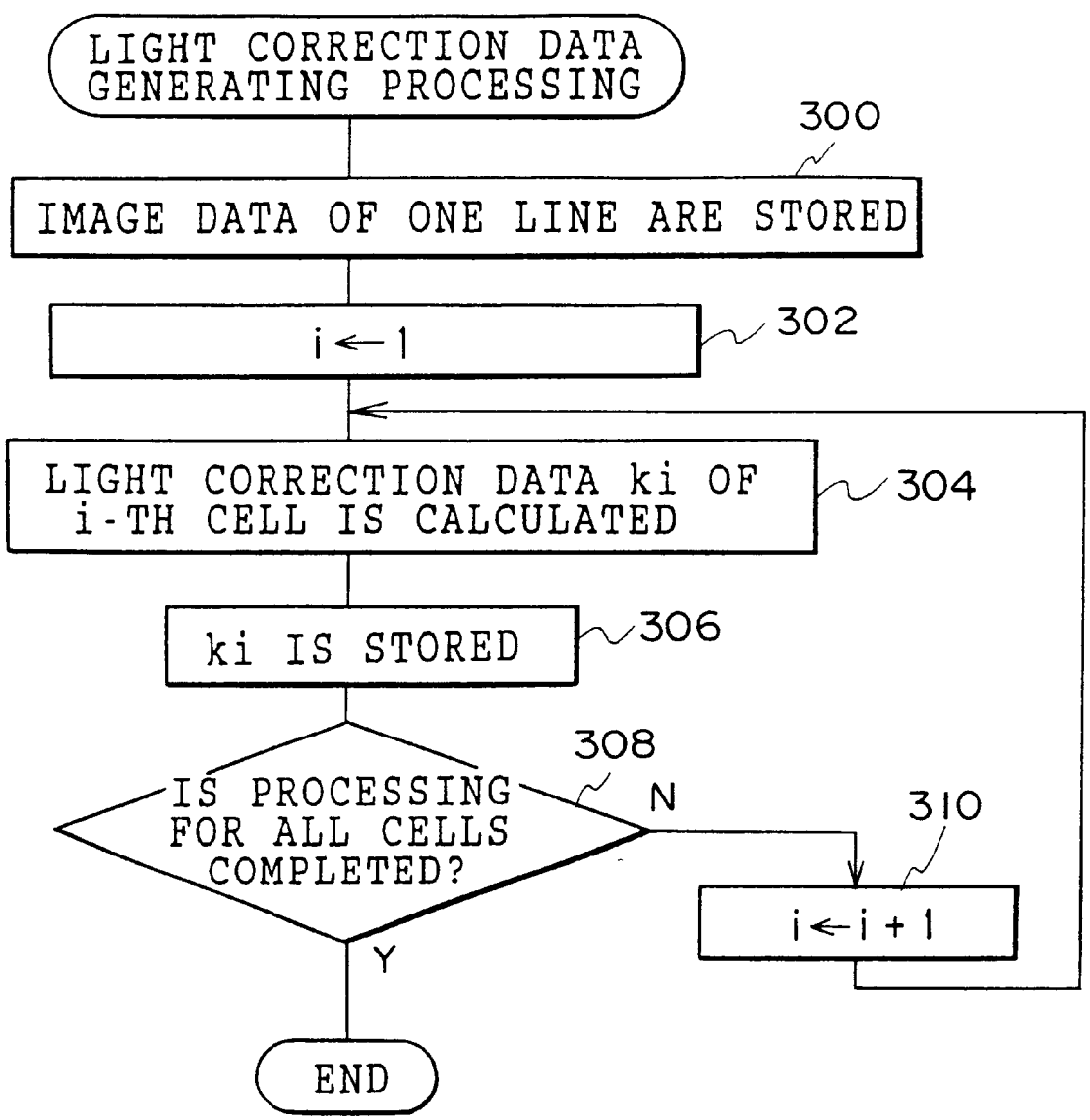

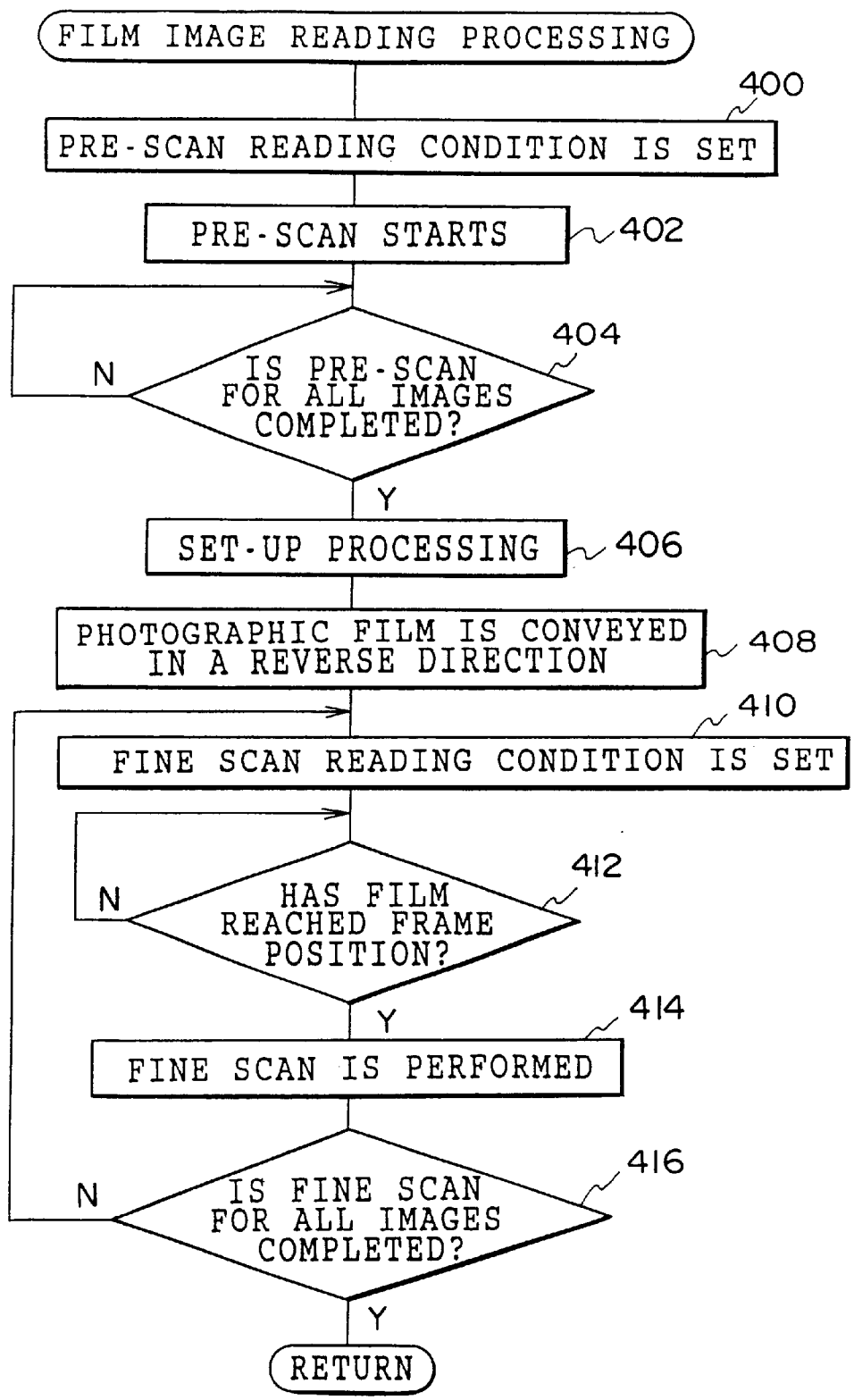

IMAGE READING METHOD AND APPARATUS

BACKGROUND OF THE INVENTION

1. Field of the Invention

The present invention relates to an image reading method and apparatus, and particularly to an image reading method and apparatus, in which light is illuminated onto a developed photosensitive material, and based on the light transmitted through the photosensitive material, images recorded on the photosensitive material are read.

2. Description of the Related Art

There has been proposed in recent years a photographic processing method in which film images recorded on a developed photosensitive material such as a photographic film (hereinafter referred to merely as photographic film) are read in a state of being separated into component colors of R, G, and B and image data obtained by the reading is subjected to image processing including various corrections, and thereafter, an image is recorded on a recording material or is displayed on a display.

In an image reading apparatus used when film images are read using this type of photographic processing method, generally, light is irradiated on a film image and light transmitted through the film image is used to form an image, and further, a film image of a photographic film to be read is read, as image data comprised of a plurality of pixels, by an image sensor provided at an image-formation position, for example, a line CCD or an area CCD. The photographic film includes a negative film on which a negative image is recorded, and a positive film (a reversal film) on which a positive image is recorded.

In the image reading apparatus as described above, in order to correct variation of photoelectric transfer characteristics between every pixel of the image sensor, and further, in order to correct illumination unevenness, generally, light correction (shading correction) which allows correction of image data read by the image sensor for each pixel is performed.

In a conventional light correction method, based on image data obtained by reading a film image for adjustment whose entire image plane has a constant density, light correction data for each of pixels forming the image sensor is previously obtained and stored, and image data for each of pixels of a photographic film to be read is corrected in accordance with the above-described light correction data.

However, in the above-described light correction method, there is a problem that prior to reading of images on a photographic film to be read, it is necessary to read a film image for adjustment, for which operation is very complicated.

In order to solve the above-described problem, in the art disclosed in Japanese Patent Application Laid-Open (JP-A) No. 5-7296, at the time of reading images of a photographic film to be read, light correction data is acquired based on image data of a non-image region between image frames.

Further, in the art disclosed in Japanese Patent Application Laid-Open (JP-A) No. 10-75354, there is disclosed a method for acquiring light correction data without using a photographic film.

In the method disclosed in JP-A No. 5-7296, the light correction data is acquired from a non-image region between image frames on a photographic film to be read. For this reason, there are problems: it is difficult to reliably acquire light correction data when a space between image frames is narrow, and when a photographic film to be read is a positive film, the light correction data cannot be acquired from a non-image region of the positive film.

On the other hand, the method disclosed in JP-A No. 10-75354 does not use a photographic film for the purpose of saving labor at the time of acquiring the light correction data. Here, there is a problem that the color balance of R, G, and B of an image sensor at the time of acquiring the light correction data is remarkably different from the color balance of R, G, and B at the time of reading a photographic film, thereby resulting in that, when the image sensor has leakage sensitivity, light correction cannot be properly performed.

SUMMARY OF THE INVENTION

The present invention has been devised to solve the above-described problems, and an object thereof is to provide an image reading apparatus and method, in which light correction data can reliably be obtained accurately and without requiring a complicated operation.

In order to achieve the above-described object, an image reading apparatus according to a first aspect of the present invention comprises: a light source which emits light for illuminating a photosensitive material; an image sensor which reads an image recorded on the photosensitive material in a state of being separated into a plurality of pixels, and outputs the read image as image data; and adjusting means for adjusting the color balance of illuminating light emitted from said light source so that respective outputs of channels of said image sensor become substantially uniform both at the time of generation of light correction data and at the time of operation for light correction.

In accordance with the image reading apparatus and the image reading method relating to the first aspect of the present invention, both at the time of generation of light correction data and at the time of operation for light correction, the color balance of illuminating light emitted from the light source, which emits light for illuminating the photosensitive material to be read, is adjusted by the adjusting means so that respective outputs of channels (of red (R), green (G), and blue (B), or of cyan (C), magenta (M), and yellow (Y)) of the image sensor, the image sensor reading an image recorded on the photosensitive material in a state of being separated into, a plurality of pixels and outputting the read image as image data, become substantially uniform.

As described above, according to the image reading apparatus and the image reading method relating to the first aspect of the present invention, both at the time of generation of light correction data and at the time of operation for light correction, the color balance of illuminating light emitted from the light source is adjusted so that respective outputs of the channels of the image sensor become substantially uniform. Accordingly, respective states of the color balance of light emitted from the light source both at the time of generation of light correction data and at the time of operation for light correction can be made substantially uniform, and a complicated operation required when using a film image for adjustment of a constant density to generate light correction data becomes unnecessary. Further, even when a space between adjacent image frames of the photosensitive material is narrow, the light correction data can reliably be generated.

An image reading apparatus according to a second aspect of the present invention comprises: a light source which emits light for illuminating a photosensitive material; an image sensor which reads an image recorded on the photosensitive material in a state of being separated into a plurality of pixels, and outputs the read image as image data; a filter section including a negative-film color balance filter suitable for a negative film and a positive-film color balance filter suitable for a positive film, and disposed between said light source and said image sensor; light correction data generating means which generates light correction data based on data obtained by reading the positive-film color balance filter by said image sensor in a state without photosensitive material; and correction means which effects light correction for image data of the photosensitive material to be read based on the light correction data.

An image reading method according to a third aspect of the present invention comprises the steps of: generating in advance light correction data based on data obtained when, in a filter section which is disposed between a light source that emits light for illuminating a photosensitive material in a state of being separated into a plurality of pixels and outputs the read image as image data and which includes a negative-film color balance filter suitable for a negative film and a positive-film color balance filter suitable for a positive film, the positive-film color balance filter suitable for a positive film, the positive-film color balance filter suitable for a positive film is read by the image sensor in a state without photosensitive material; and based on the light correction data, effecting light correction for image data of a photosensitive material to be read.

In accordance with the image reading apparatus relating to the second aspect of the present invention and the image reading method relating to the third aspect of the present invention, the light correction data is generated based on an arithmetic mean value of data of identical pixels when the positive-film color balance filter is read by the image sensor a plurality of times without photosensitive material.

Here, the principle of the present invention will be described.

The positive-film color balance filter in the present invention is structured so that respective outputs of channels of the image sensor become substantially uniform when it is used at the time of reading a film image of a positive film. Similarly, the negative-film color balance filter is also structured so that respective outputs of channels of the image sensor become substantially uniform when it is used at the time of reading a film image of a negative film. Namely, these color balance filters are each designed so that a value obtained by integrating, by wavelength, an overall spectral characteristic provided by multiplying a spectral transmission factor of a photographic film, spectral distribution of light from illumination including the color balance filters, and spectral sensitivity of the image sensor by the wavelength becomes substantially uniform in each channel. On the other hand, a developed negative film usually inclines toward orange, and therefore, the negative-film color balance filter is provided to incline toward cyan which is complementary to that inclining to orange.

Accordingly, in reading a film image of a positive film using the positive-film color balance filter, when light correction is performed using light correction data generated using the negative-film color balance filter, respective outputs of channels of the image sensor cannot be made substantially uniform. As a result, proper light correction cannot be effected. On the other hand, in reading a film image of a negative film using the negative-film color balance filter, when light correction is performed using light correction data generated using the positive-film color balance filter, respective outputs of channels of the image sensor can be maintained in a substantially uniform state. As a result, proper light correction can be effected. Incidentally, in reading a film image of a positive film using the positive-film color balance filter, when light correction is effected using the light correction data generated using the positive-film color balance filter, proper light correction is of course allowed.

Accordingly, in the present invention, light correction data is acquired using the positive-film color balance filter, and the light correction data is provided so as to be used for light correction of both a positive film and a negative film.

The characteristics of CCD cells of one line in the channel of red (R) in a color line CCD when the photosensitive material to be read is a negative film, a color line CCD is used as the image sensor, and the negative-film color balance filter is used at the time of reading images on the photosensitive material (that is, at the time of reading a photographic film) were examined.

FIGS. 10A to 10D are graphs which show various states when light correction data is acquired without using any color balance filter. FIGS. 11A to 11D are graphs which show various states when light correction data is acquired using a positive-film color balance filter. Note that these figures each show measurement results of pixels in seven places, having sensitivities that differ by 10%. FIGS. 10A and 11A each show spectral characteristics of the above-described pixels in seven places when the light correction data is acquired, and FIGS. 10B and 11B each show spectral characteristics of the above-described pixels in seven places when a photographic film is read. FIGS. 10C and 11C each show respective shading amounts of the above-described pixels in seven places at the time of acquiring the light correction data and at the time of reading the photographic film, and FIGS. 10D and 11D each show residuals of respective shading amounts of the above-described pixels in seven places at the time of acquiring the light correction data and at the time of reading the photographic film.

Here, the pixels in seven places, having different sensitivities that differ by 10%, are provided such that the thickness of a color separation filter mounted on a light incident side of a line CCD varies every 10%. Accordingly, the transverse axis in FIGS. 10C, 11C, 10D, and 11D indicates a ratio (%) of change in the thickness of the color separation filter (that is, pixels provided every 10% of a range in which the ratio of change in the thickness is from −30% to +30%. Further, the vertical axis in FIGS. 10A, 11A, 10B, and 11B indicates an overall spectral characteristic of the entire apparatus. This is a spectral characteristic provided by multiplying, by wavelength, a spectral transmission factor of the photographic film (which is not considered in FIGS. 10A and 11A, and is considered only in FIGS. 10B and 11B), spectral distribution of illuminating light of illumination including the color balance filters, and a spectral sensitivity of the image sensor. The shading amount (%) represented by the transverse axis in FIGS. 10C and 11C is indicated by a normalized value so that it becomes 0% when the ratio of change in the thickness of the color separation filter is 0%.

The spectral characteristic at the time of acquiring light correction data shown in FIG. 10A and the spectral characteristic at the time of reading a photographic film shown in FIG. 10B greatly differ from each other in the graphical form in a wavelength region of about 500 nm or more.

As shown in FIG. 10C, a discrepancy occurs in the respective shading amounts in the pixels of seven places at the time of acquiring light correction data and at the time of reading the photographic film. It can be seen from the graph shown in FIG. 10D that a remaining difference between the shading amounts at the time of acquiring light correction data and at the time of reading a photographic film is large in the pixels when the ratio of change in the thickness of the color separation filter is 0% or less.

Accordingly, it can be understood that even if light correction is performed at the time of reading the photographic film using light correction data acquired without using the color balance filter, accurate light correction cannot be achieved.

On the other hand, in a case in which the positive-film color balance filter is used at the time of acquiring the light correction data, the spectral characteristic at the time of acquiring light correction data, which is shown in FIG. 11A, and the spectral characteristic at the time of reading a photographic film, which is shown in FIG. 11B, each have the substantially same graphical form.

In this case, as shown in FIG. 11C, a dicrepancy in the shading amount in the pixels of seven places at the time of acquiring light correction data and at the time of reading the photographic film is minimal. It can be seen from the graph shown in FIG. 11D that a remaining difference between the shading amounts at the time of acquiring light correction data and at the time of reading the photographic film is about 0% in all pixels.

Accordingly, it can be proved that when light correction is performed at the time of reading the photographic film using light correction data acquired using the positive-film color balance filter, highly accurate light correction can be achieved.

As described above, according to the image reading apparatus relating to the second aspect of the present invention and also according to the image reading method relating to the fourth aspect of the present invention, the color balance filter suitable for a negative film and the color balance filter suitable for a positive film are provided, and based on the data acquired by reading the color balance filter suitable for a positive film, light correction data which allows accurate light correction both for a negative film and for a positive film is generated. Accordingly, a complicated operation required when using a film image for adjustment of a constant density to generate light correction data becomes unnecessary, and even if a space between adjacent image frames on the photosensitive material is narrow, light correction data can reliably be generated with accuracy.

An image reading apparatus according to a third aspect of the present invention is characterized in that, in the image reading apparatus relating to the second aspect of the present invention, (claim 3). Further, an image reading method according to a fifth aspect of the present invention is characterized in that, in the image reading method relating to the fourth aspect of the present invention, (claim 5).

As described above, according to the image reading apparatus relating to the third aspect of the present invention and also according to the image reading method relating to the fifth aspect of the present invention, the light correction data in the second and fourth aspects of the present invention is generated based on an arithmetic mean value of data of identical pixels when the positive-film color balance filter is read by the image sensor a plurality of times in a state without the photosensitive material. Accordingly, the light correction data can be made into highly accurate data that is not easily susceptible to noise or the like.

BRIEF DESCRIPTION OF THE DRAWINGS

FIG. 8 is a flowchart which schematically shows light correction data generating processing executed by the microprocessor of the line CCD scanner in the embodiment of the present invention.

FIG. 9 is a flowchart which schematically shows film image reading processing executed by the microprocessor of the line CCD scanner in the embodiment of the present invention.

FIG. 10A is a graph showing spectral characteristics of the above-described pixels at the seven places at the time of acquiring light correction data; FIG. 10B is a graph showing spectral characteristics of the above-described pixels at the seven places at the time of reading a photographic film; FIG. 10C is a graph showing respective amounts of shading in the above-described pixels at the seven places at the time of acquiring light correction data and at the time of reading the photographic film; and FIG. 10D is a graph showing a ratio of a difference between the amount of shading at the time of acquiring the light correction data and the amount of shading at the time of reading the photographic film.

FIG. 11A is a graph showing spectral characteristics of the above-described pixels at the seven places at the time of acquiring light correction data; FIG. 11B is a graph showing spectral characteristics of the above-described pixels at the seven places at the time of reading a photographic film; FIG. 11C is a graph showing respective amounts of shading in the above-described pixels at seven places at the time of acquiring light correction data and at the time of reading the photographic film; and FIG. 11D is a graph showing a percentage of a difference between the amount of shading at the time of acquiring the light correction data and the amount of shading at the time of reading the photographic film.

DESCRIPTION OF THE PREFERRED EMBODIMENTS

Referring now to the Figures, an embodiment of the present invention will be hereinafter described in detail.

Figure 1:
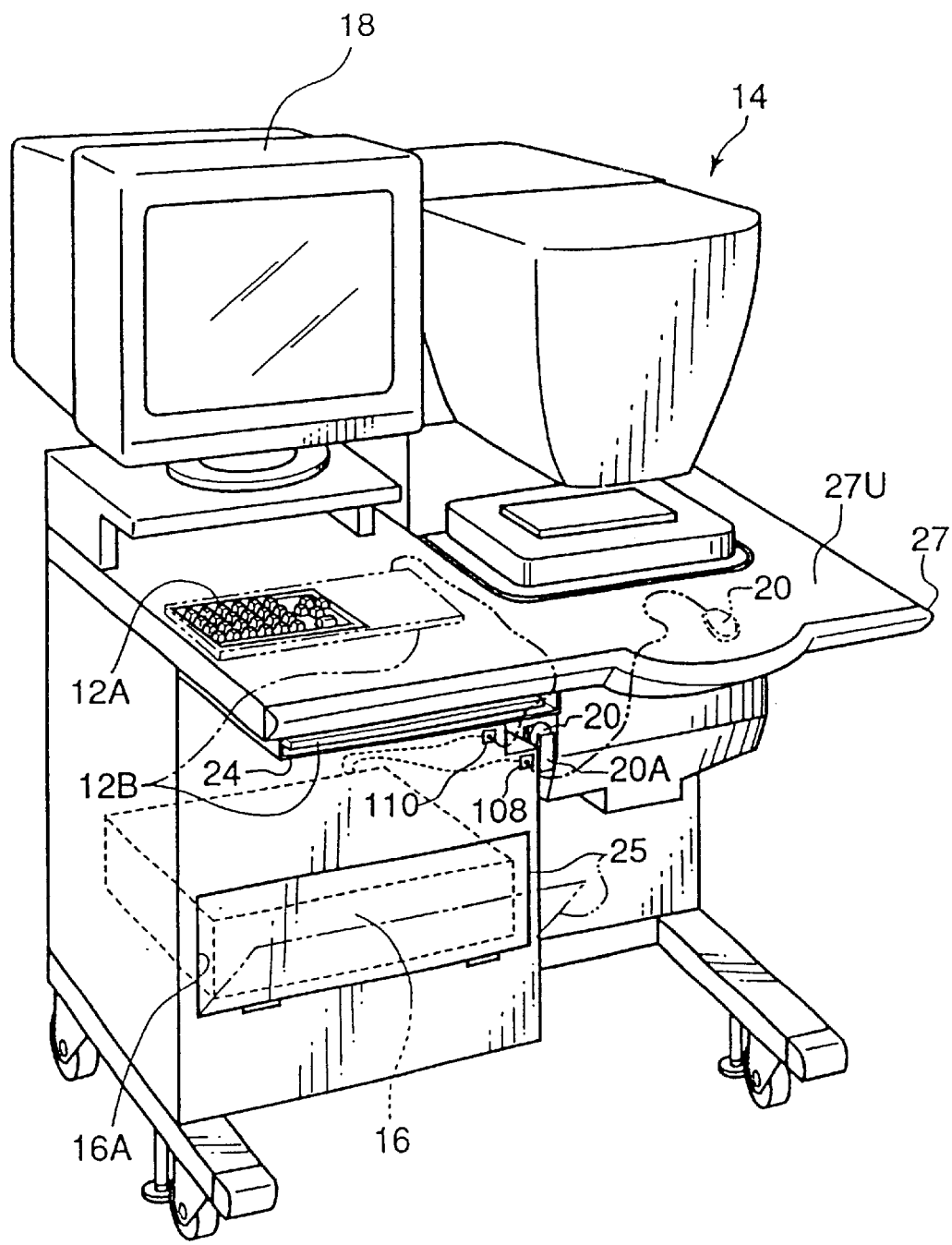
FIG. 1 is an outside view of an image reading apparatus according to an embodiment of the present invention.

As shown in FIG. 1, an image reading apparatus according to the embodiment of the present invention includes a line CCD scanner 14. The line CCD scanner 14 is placed on a work table 27 with an image processing section 16, a mouse 20, two types of keyboards 12A and 12B, and a display 18 being provided thereon.

One of the keyboards, the keyboard 12A, is embedded in a work surface 27U of the work table 27. Another keyboard 12B is accommodated in a drawer 24 of the work table 27 when not in use. When using the keyboard 12B, it is taken out of the drawer 24 and placed over the keyboard 12A. At this time, a cord of the keyboard 12B is joined to a jack 110 connected to the image processing section 16.

A cord of the mouse 20 is joined to the image processing section 16 via a through hole 108 formed in the work table 27. The mouse 20 is accommodated in a mouse holder 20A when not in use. When using the mouse 20, it is taken out of the mouse holder 20A and placed on the work surface 27U.

The image processing section 16 is accommodated in an accommodating portion 16A provided in the work table 27 and is closed by a hatch 25. The image processing section 16 can be taken out after opening the hatch 25.

The line CCD scanner 14 is used to read film images recorded on a photographic film such as a negative film or a positive film. Examples of the photographic film on which film images to be read are recorded include a 135-size photographic film, a 110-size photographic film, a photographic film with a transparent magnetic layer formed thereon (i.e., a 240-size photographic film: a so-called APS film), and 120-size and 220-size photographic films (Brownie size). The line CCD scanner 14 reads the above-described film images to be read by a line CCD and outputs image data.

The image processing section 16 inputs image data outputted from the line CCD scanner 14 and effects image processing including various corrections and the like for the inputted image data, and further, outputs, image data for recording to a laser printer section (not shown).

Figure 2:
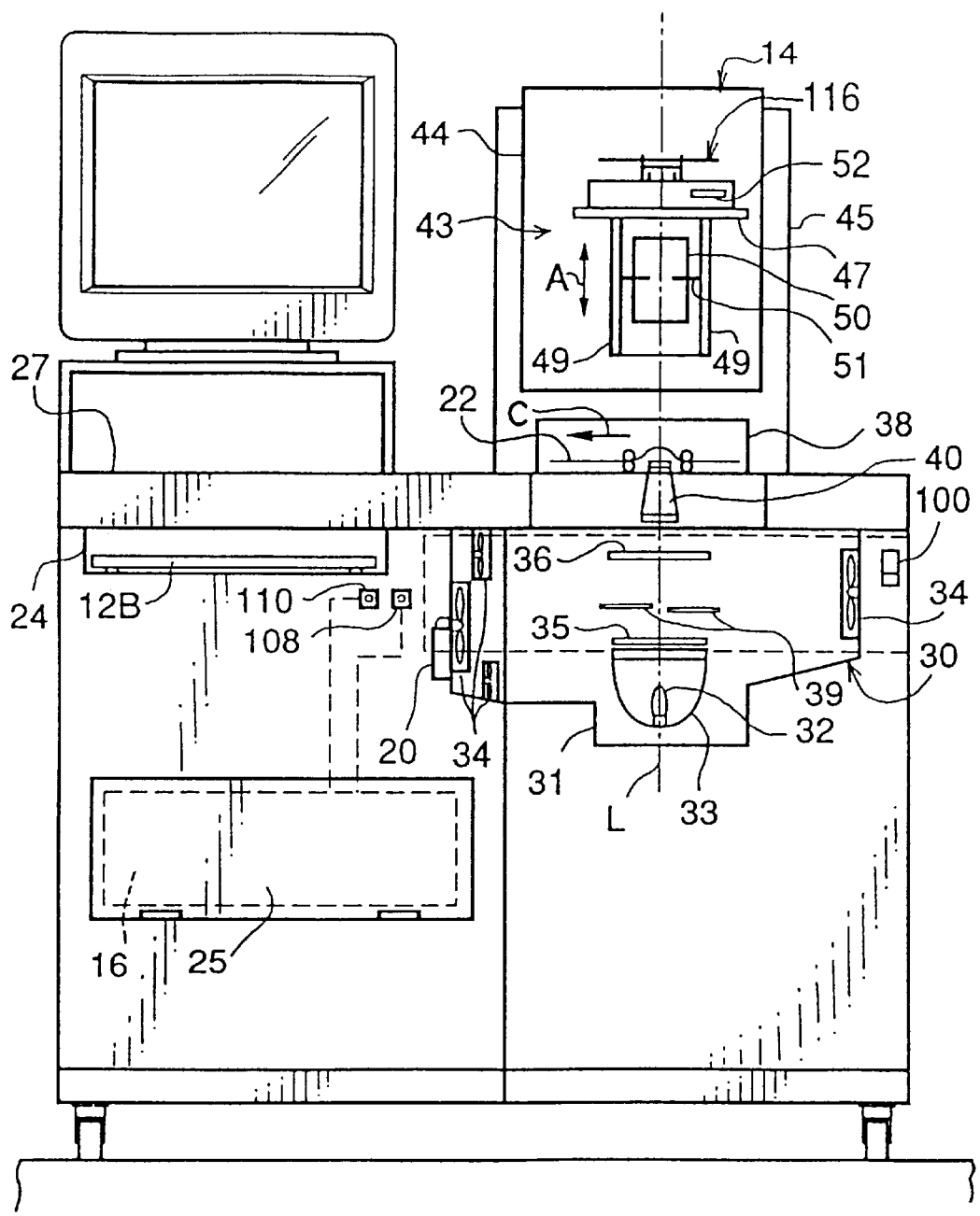
FIG. 2 is a cross-sectional view of an optical system of the image reading apparatus according to the embodiment of the present invention as seen from the front of the apparatus.
Figure 3:
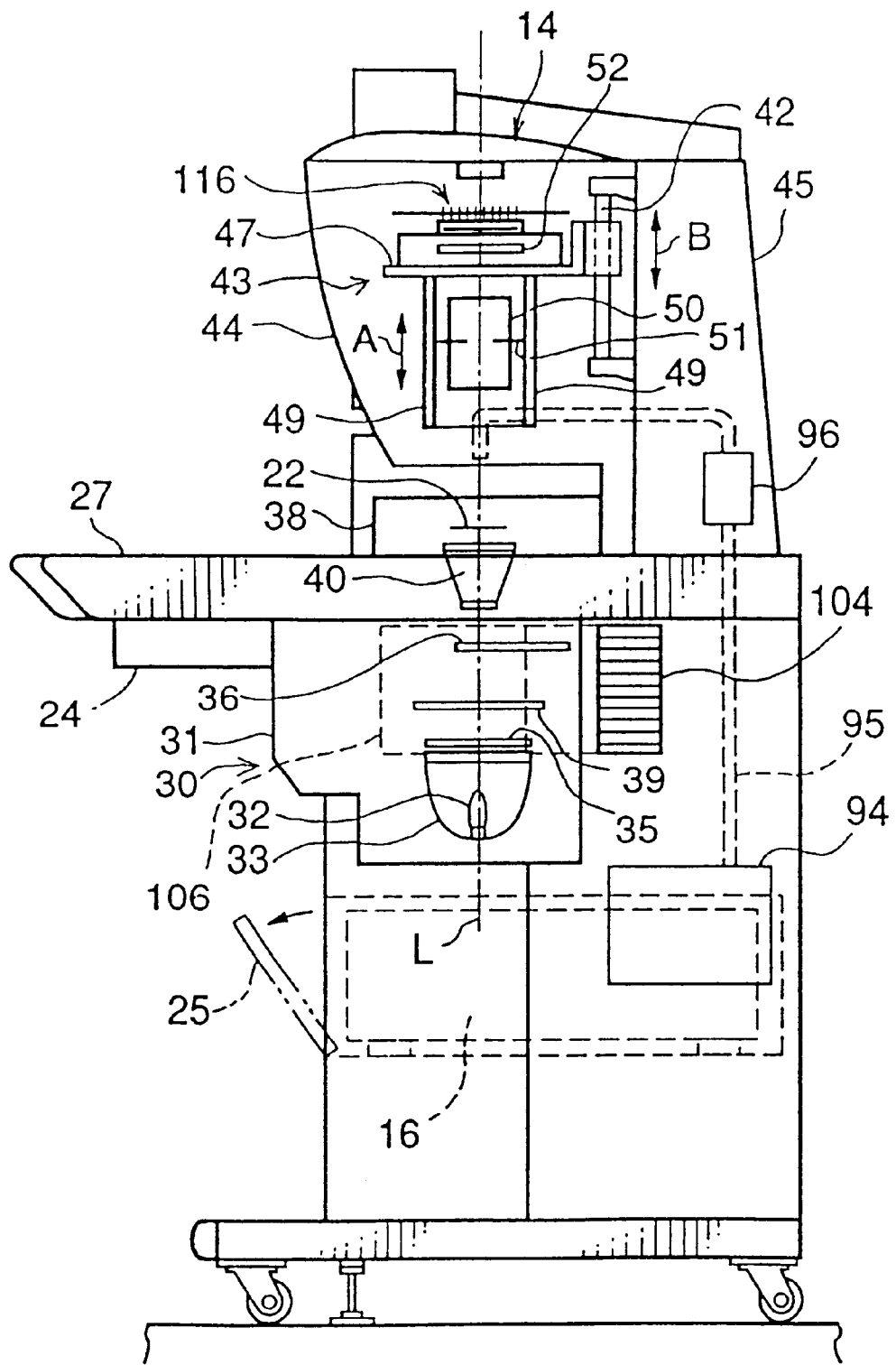
FIG. 3 is a cross-sectional view of the optical system of the image reading apparatus according to the embodiment of the present invention as seen from a side of the apparatus.

As shown in FIGS. 2 and 3, an optical system of the line CCD scanner 14 includes a light source portion 30, a diffusion box 40, a film carrier 38, and a reading section 43. The light source portion 30 is disposed below the work table 27 and the diffusion box 40 is supported by the work table 27. The film carrier 38 is set on the work table 27 and the reading section 43 is disposed at the side of the work table 27 opposite to the side at which the light source portion 30 is disposed.

The light source portion 30 is accommodated in a casing 31 made of metal. A lamp 32 comprised of a halogen lamp or a metal halide lamp is disposed within the casing 31.

A reflector 33 is provided at a periphery of the lamp 32, and a portion of the light emitted from the lamp 32 is reflected by the reflector 33 so as to be reflected off in a fixed direction. A plurality of fans 34 are provided at sides of the reflector 33. The fans 34 are operated when the lamp 32 is lit so as to prevent an interior of the casing 31 from being overheating.

A UV/IR cutting filter 35, a diaphragm 39, and a turret 36 (also seen in FIG. 4B) are disposed in that order at a light emission side of the reflector 33. The UV/IR cutting filter 35 prevents chemical changes caused in the photographic film 22 by cutting light having wavelengths in ultraviolet and infrared regions along an optical axis L of the light emitted from the reflector 33 and further prevents increases in temperature so as to improve reading accuracy. The diaphragm 39 is provided to adjust the amount of light from the lamp 32 and the amount of light reflected by the reflector 33. The turret 36 includes a negative-film balance filter 36N and a positive-film balance filter 36P, which are embedded in the turret 36 so as to allow proper setting of color components of light which reaches the photographic film 22 and the reading section 43 in accordance with the kind of photographic film (a negative film or a positive film). The photographic film 22 corresponds to a photosensitive material of the present invention, the balance filter 36N corresponds to a negative-film color balance filter of the present invention, the balance filter 36P corresponds to a positive-film color balance filter of the present invention, and the turret 36 corresponds to a filter portion and adjustment means of the present invention.

Figure 4A:
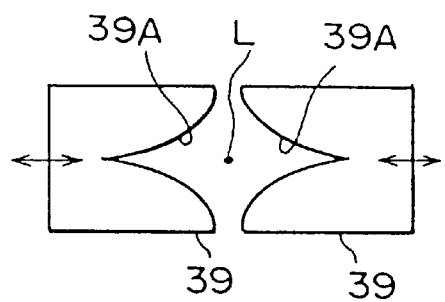
FIGS. 4A, 4B, 4C, and 4D are plan views respectively showing examples of a diaphragm, a turret, a lens diaphragm, and a CCD shutter.

The diaphragm 39 is comprised of a pair of plate materials which are disposed with the optical axis L interposed therebetween. The pair of plate materials are allowed to move in a sliding manner so as to move toward and apart from each other. As shown in FIG. 4A, the pair of plate materials of the diaphragm 39 each include a notch 39A formed at one end thereof in a direction in which the diaphragm 39 slides so that a cross-sectional area of each plate material along a direction perpendicular to the direction of sliding changes continuously from the one end toward the other end of the plate material. The diaphragm 39 is disposed so that the sides of the plate materials having the notches 39A formed thereon face each other.

In the above-described structure, any one of the filters (36N and 36P) corresponding to the kind of photographic film is located on the optical axis L so that light of desired color components is obtained, and light passing through the diaphragm 39 is adjusted to a desired amount of light by the position of the diaphragm 39.

The diffusion box 40 is formed in such a manner that, toward a top portion thereof (that is, in a direction nearing the photographic film 22), a dimension of the diffusion box 40 along a direction in which the photographic film 22 is conveyed by the film carrier 38 decreases (see FIG. 2) and a dimension of the diffusion box 40 along a direction perpendicular to the direction in which the photographic film 22 is conveyed increases (see FIG. 3). A light diffusion plate (not shown) is mounted at each of a light entering side and a light exiting side of the diffusion box 40. The above-described diffusion box 40 is used for a 135-size photographic film, but diffusion boxes (not shown) formed to correspond to other photographic films may also be readied for use.

Light entering the diffusion box 40 is directed to the film carrier 38 (that is, to the photographic film 22) and is made into slit light whose longitudinal direction coincides with a transverse direction of the photographic film 22. Further, the incident light is made into diffused light by the light diffusion plates and exits (from the light diffusion box 40). Due to the light exiting the diffusion box 40 being made into diffused light as described above, unevenness in the amount of light illuminated onto the photographic film 22 is decreased and a uniform amount of slit light is illuminated onto the film image. Even if the film image is scratched, the scratches are difficult to notice.

The film carrier 38 and the diffusion box 40 are readied for every type of the photographic film 22 and are selected in accordance with the type of the photographic film 22.

An elongated opening (not shown) whose longitudinal dimension is larger than the transverse dimension of the photographic film 22 is formed along the transverse direction of the photographic film 22 at each of positions intersecting the optical axis L on upper and lower surfaces of the film carrier 38. Slit light from the diffusion box 40 is illuminated onto the photographic film 22 through the opening provided on the lower surface of the film carrier 38, and the light transmitted through the photographic film 22 reaches the reading section 43 through the opening provided on the upper surface of the film carrier 38.

A guide (not shown) for guiding the photographic film 22 is provided in the film carrier 38 so that the photographic film 22 is bent at a position where the slit light from the diffusion box 40 is illuminated (that is, a reading position). As a result, the surface flatness of the photographic film 22 at the reading position is ensured.

The diffusion box 40 is supported so that the upper surface thereof is near the above-described reading position. Accordingly, in order to prevent the film carrier 38 and the diffusion box 40 from interfering with each other when loading the film carrier 38, a cut-out portion is formed on the lower surface of the film carrier 38.

The film carrier 38 is structured so as to be able to convey the photographic film 22 at different speeds in accordance with the density of a film image and the like, during pre-scan or fine scan.

The reading section 43 is disposed in a state of being accommodated within the casing 44. A mounting stand 47 with a line CCD 116 being provided on the upper surface thereof is disposed within the casing 44 and a plurality of supporting rails 49 extend downward from the mounting stand 47. A lens unit 50 is supported by the supporting rails 49 in such a manner as to move slidably in directions indicated by double-headed arrow A so as to move toward and apart from the work table 27, in order to alter the magnification, for example, reduction or enlargement. A support frame 45 is provided upright on the work table 27. The mounting stand 47 is supported by a guide rail 42 mounted on the support frame 45 in such a manner as to be slidable in directions indicated by double-headed arrow B so as to move toward and apart from the work table 27, in order to maintain a conjugate length during alteration of the magnification, or during automatic focusing. The lens unit 50 is comprised of a plurality of lenses and a lens diaphragm 51 is provided among the plurality of lenses. As shown in FIG. 4C, the lens diaphragm 51 includes a plurality of diaphragm plates 51A which are each formed to have a substantially C-shaped configuration. These diaphragm plates 51A are arranged around the optical axis L at regular intervals. One end of each diaphragm plate 51A is supported by a pin and the diaphragm plates 51A are each allowed to rotate on the pin. The plurality of diaphragm plates 51A are joined together by a link (not shown), and when driving force of a lens diaphragm driving motor (described later) is transmitted to the lens diaphragm 51, these diaphragm plates 51A rotate together in the same direction. Due to the rotation of the diaphragm plates 51A, an area of the region which is not cut off from light by the diaphragm plates 51A (that is, a substantially star-shaped portion shown in FIG. 4C) changes around the optical axis L as the center, and an amount of light passing through the lens diaphragm 51 thereby changes.

In the line CCD 116, three sensing portions each including a large number of photoelectric transfer elements such as CCD cells and photodiodes, which are arranged in a row along the transverse direction of the photographic film 22, and further including an electronic shutter mechanism are provided in parallel at intervals to form three lines and color separation filters of R, G, and B are respectively mounted at light incident sides of the three sensing portions (a so-called three-line primary color CCD). A transmitting portion comprised of a large number of CCD cells is provided in the vicinity of each of the sensing portions so as to correspond to the sensing portion. Electric charge accumulated in every CCD, cell in each of the sensing portions is transmitted sequentially via the transmitting portion corresponding to the sensing portion.

A CCD shutter 52 is provided at the side of the line CCD 16 where light is made incident. As shown in FIG. 4D, an ND filter 52ND is fitted in the CCD shutter 52. The CCD shutter 52 rotates in a direction indicated by arrow u so as to be changed to any one of the following states: a completely closed state which blocks light that would otherwise be incident on the line CCD 116 and which is for dark correction (a portion 52B, which does not have an ND filter 52ND embedded therein, is located at a position 52c including the optical axis L); a completely open state which allows light to be incident on the line CCD 116 and which is for normal reading or light correction (the position shown in FIG. 4D); and a reduced light state, in which light made incident on the line CCD 16 is reduced by the ND filter 52ND and which is for linearity correction (that is, a state in which the ND filter 52ND is located at the position 52C).

As shown in FIG. 3, the work table 27 is provided with a compressor 94 which generates cooling air for cooling the photographic film 22. The cooling air generated by the compressor 94 is fed by a guide pipe 95 and supplied to a reading section (not shown) of the film carrier 38. As a result, a region of the photographic film 22 located at the reading section can be cooled. The guide pipe 95 passes through a flow sensor 96 for detecting the flow rate of the cooling air.

Figure 5:
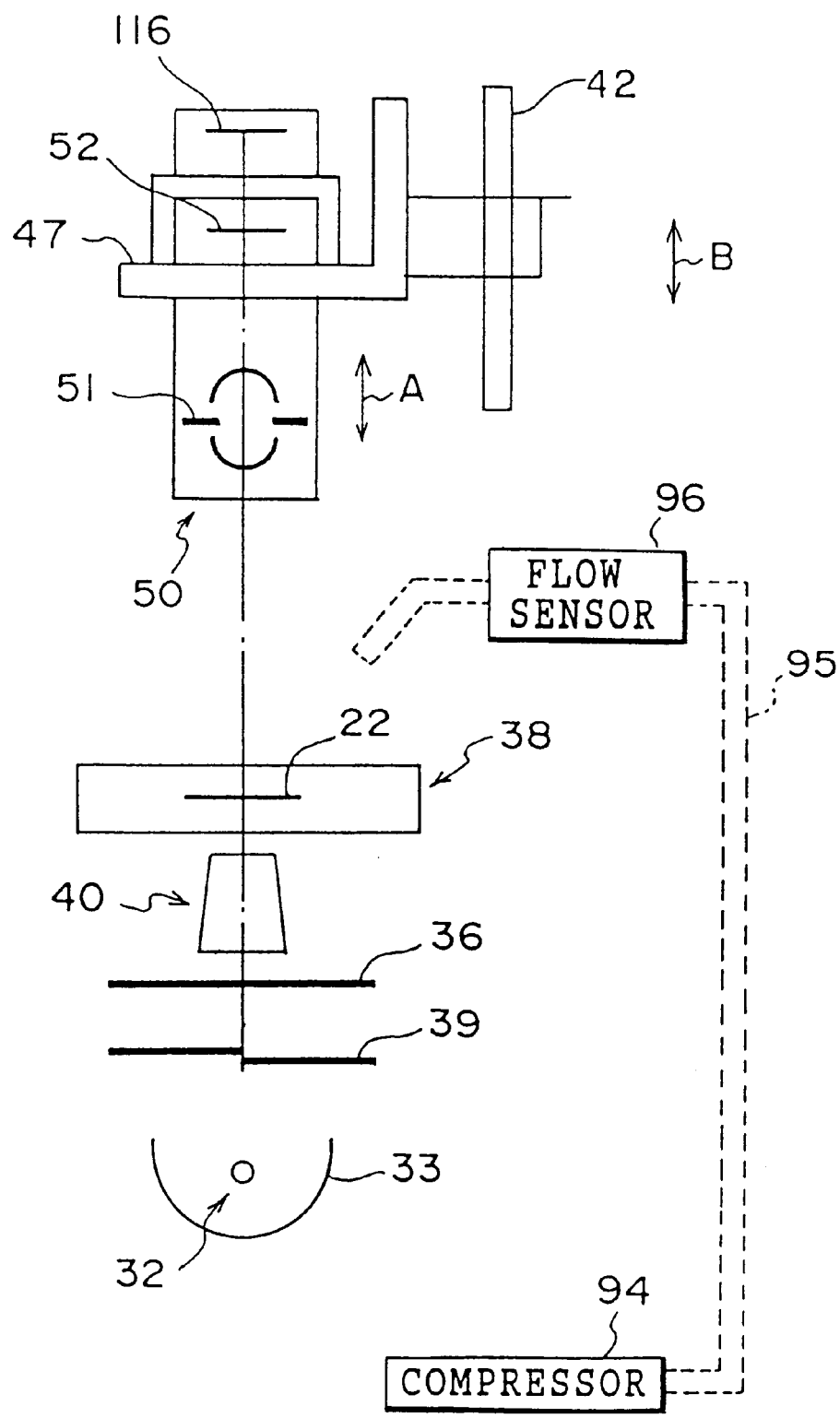
FIG. 5 is a schematic diagram which only shows principal portions of the optical system of the image reading apparatus according to the embodiment of the present invention.
Figure 6:
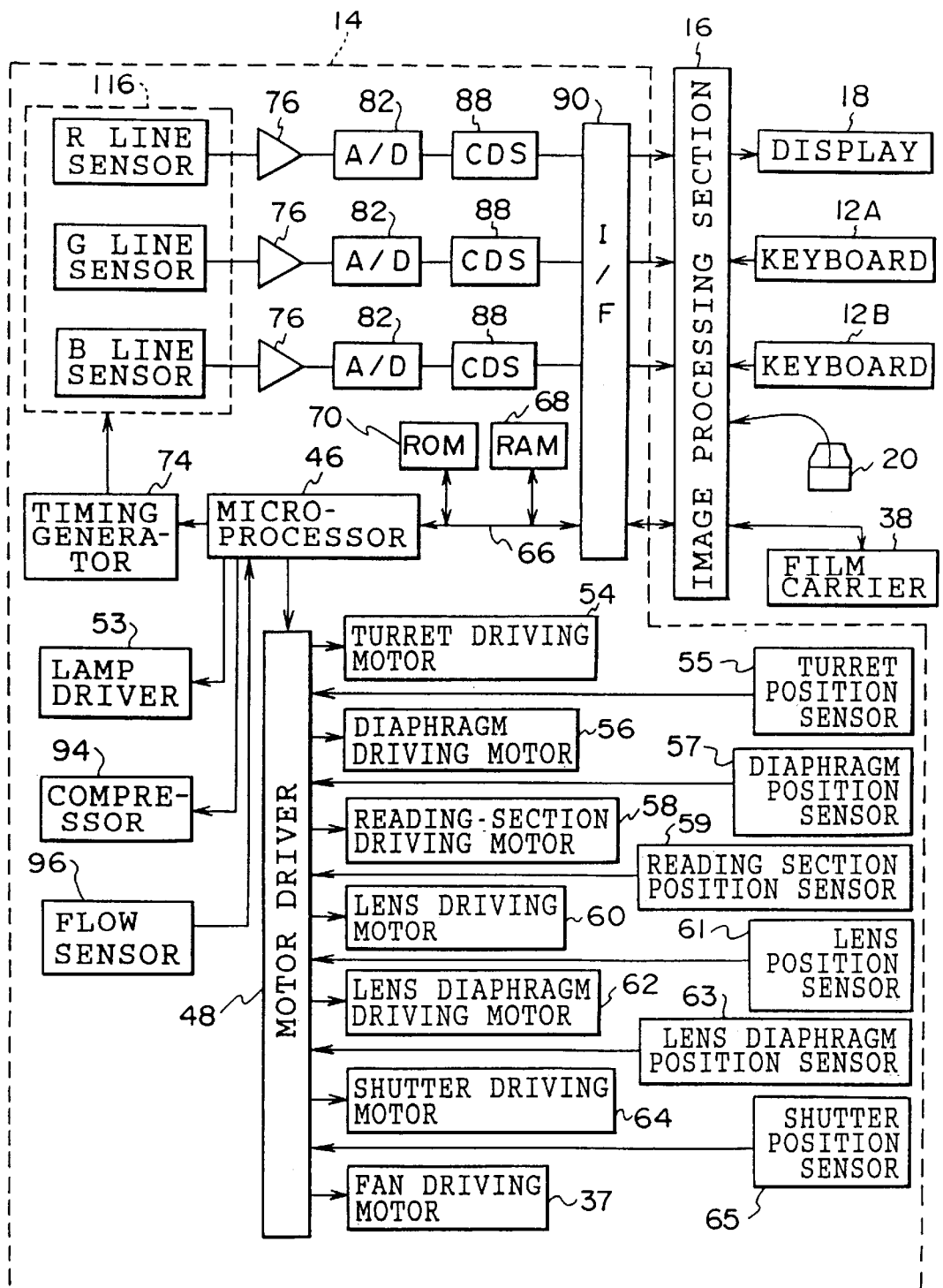
FIG. 6 is a block diagram which schematically shows a structure of an electric system of a line CCD scanner in the image reading apparatus according to the embodiment of the present invention.

Next, with reference to principal portions of an optical system of the line CCD scanner 14 shown in FIG. 5, a schematic structure of an electric system of the line CCD scanner 14 and of the image processing section 16 will be described while referring to FIG. 6.

The line CCD scanner 14 includes a microprocessor 46 which controls the entire line CCD scanner 14. Connected via a bus 66 to the microprocessor 46 are a RAM 68 (for example, a SRAM) and a ROM 70 (for example, a ROM which allows rewriting of contents stored therein). A lamp driver 53, the compressor 94, the flow sensor 96, and a motor driver 48 are also connected to the microprocessor 46. The lamp driver 53 turns on and off the lamp 32 in accordance with instructions from the microprocessor 46. During reading of film images on the photographic film 22, the microprocessor 46 operates the compressor 94 so as to allow supply of cooling air for the photographic film 22. The flow rate of the cooling air is detected by the flow sensor 96, and based on the detected result, the microprocessor 46 detects malfunction.

Figure 4B:
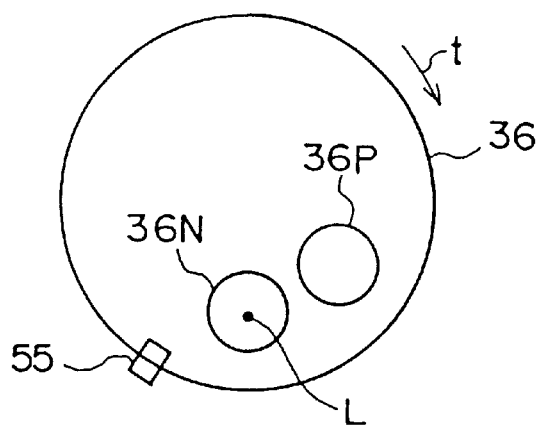
Figure 4C:
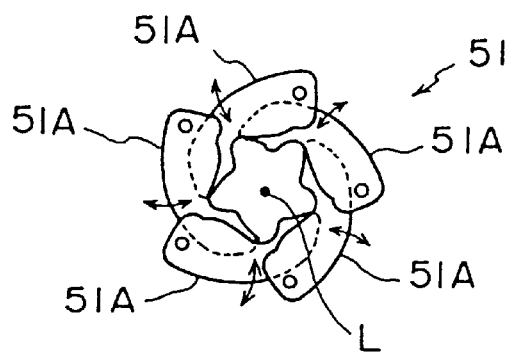
Figure 4D:
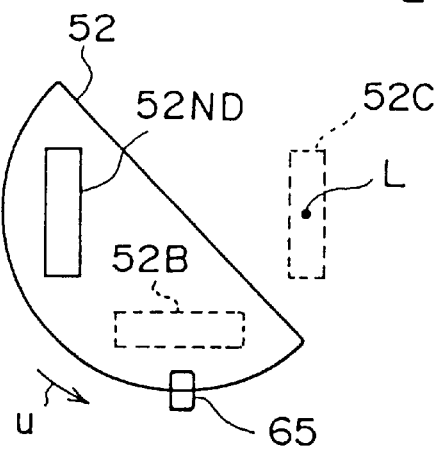

Connected to the motor driver 48 are a turret driving motor 54 and a turret position sensor 55 (also shown in FIG. 4B). The turret driving motor 54 drives the turret 36 to rotate in the direction indicated by arrow t in FIG. 4B so that any one of the negative-film balance filter 36N and the positive-film balance filter 36P is positioned on the optical axis L, and the turret position sensor 55 detects a reference position (an unillustrated notch) of the turret 36. Also connected to the motor driver 48 are a diaphragm driving motor 56 for moving the diaphragm 39 in a sliding manner, a diaphragm position sensor 57 for detecting the position of the diaphragm 39, a reading section driving motor 58 for moving the mounting stand 47 (that is, the line CCD 116 and the lens unit 50) along the guide rail 42 in a sliding manner, a reading section position sensor 59 for detecting the position of the mounting stand 47, a lens driving motor 60 for moving the lens unit 50 along the supporting rails 49 in a sliding manner, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (that is, the positions of the diaphragm plates 51A), a shutter driving motor 64 for changing the state of the CCD shutter 52 to any one of the completely closed state, the completely open state, and the reduced light state, a shutter position sensor 65 for detecting the position of the shutter, and a fan driving motor 37 for driving the fan 34.

During pre-scan (preliminary reading) and fine scan (main reading) by the line CCD 116, the microprocessor 46 drives to rotate the turret 36 by the turret driving motor 54 based on respective positions of the turret 36 and the diaphragm 39, which are detected by the turret position sensor 55 and the diaphragm position sensor 57, and further, moves slidingly the diaphragm 39 by the diaphragm driving motor 56 so as to allow adjustment of light illuminated onto the film image.

Further, the microprocessor 46 determines the size of a film image or determines a zoom magnification in accordance with a determination as to whether trimming is carried out or the like, and moves slidingly the mounting stand 47 by the reading section driving motor 58 on the basis of the position of the mounting stand 47 detected by the reading section position sensor 59, so that the film image is read by the line CCD 116 at the determined zoom magnification. The microprocessor 46 also moves slidingly the lens unit 50 by the lens driving motor 60 based on the position of the lens unit 50 detected by the lens position sensor 61.

When automatic focusing control is performed in which a light receiving surface of the line CCD 116 is made to coincide with an image-formation position of a film image by the lens unit 50, the microprocessor 46 slides to move only the mounting stand 47 by the reading section driving motor 58. This automatic focusing control can be performed in such a manner that, as an example, the contrast of a film image read by the line CCD 116 is a maximum (a so-called image contrast approach). Alternatively, the automatic focusing control may also be performed without using the data of a film image and based on a distance detected by a distance sensor which measures the distance between the photographic film 22 and the lens unit 50 (or the line CCD 116) by infrared rays or the like.

A timing generator 74 is connected to the line CCD 116. The timing generator 74 generates various timing signals (clock signals) for operating the line CCD 116, an analog-digital (A/D) converters 82 (described later), and the like. Output ends of signals from the line CCD 116 are connected via amplifiers 76 to the A/D converters 82, respectively, and the signals outputted from the line CCD 116 are each amplified by the amplifier 76 and converted to digital data in the A/D converter 82.

An output end of each A/D converter 82 is connected to the image processing section 16 sequentially via a correlation double sampling circuit (CDS) 88 and an interface (I/F) circuit 90. In each CD.S 88, feed-through data which represents the level of a feed-through signal and pixel data which represents the level of a pixel signal are each sampled, and the feed-through data is subtracted from the pixel data for each pixel. Then, the CDS 88 sequentially outputs, as scan image data, calculated results (that is, pixel data which exactly corresponds to respective amounts of charge accumulated in the CCD cells) to the image processing section 16 via the I/F circuit 90.

Photometric signals of R, G, and B are outputted from the line CCD 116 in parallel, and therefore, three signal processing systems each including the amplifier 76, the A/D converter 82, and the CDS 88 are provided. The image data of R, G, and B are inputted as scan image data in parallel from the I/F circuit 90 to the image processing section 16.

Also connected to the image processing section 16 are the above-described display 18, the keyboards 12A and 12B, the mouse 20, and the film carrier 38.

In the microprocessor 46, dark correction and light correction are performed for the image data of R, G, and B outputted from the line CCD scanner 14 in parallel.

The dark correction is performed to cancel a dark current which flows through the line CCD 116 in a state in which light is not made incident on the light-incident side of the line CCD 116, and allows correction of image data by storing, for each of the cells, data outputted from the line CCD scanner 14 (that is, data which represents a dark output level of each of the cells of the sensing portions of the line CCD 116) in a state in which the light-incident side of the line CCD 116 is cut off from light by the CCD shutter 52 and further by subtracting dark output levels of the cell corresponding to the respective pixels from image data outputted from the line CCD scanner 14 after reading the photographic film 22 by the line CCD 116.

The light correction is performed to correct variation in the photoelectric transfer characteristics of the line CCD 116 from cell to cell, and to correct illumination unevenness. In a state in which an original such as the photographic film 22 is not set in the film carrier 38 and the center of the balance filter 36P substantially coincides with the optical axis L, a gain (light correction data) is determined for each cell based on image data outputted from the line CCD scanner 14 after reading an image by the line CCD 116 (irregularities in densities y of respective pixels represented by the image data is caused by the variation in the photoelectric transfer characteristics from cell to cell, and by illumination unevenness). Then, image data of a film image to be read, which is outputted from the line CCD scanner 14, is corrected for each of the pixels in accordance with a gain determined for each of the cells.

In the image processing section 16, various image processing is performed which includes gradation conversion, color conversion, hyper-tone processing for compressing the gradation of an ultra-low frequency brightness component of an image, and hyper-sharpness processing for highlighting sharpness while controlling graininess.

The microprocessor 46 corresponds to light correction data generating means and correction means of the present invention, the lamp 32 corresponds to a light source of the present invention, and the line CCD 116 corresponds to an image sensor of the present invention.

Next, as operation of the present embodiment, line scanner control processing executed by the microprocessor 46 in the line CCD 'scanner 14 will be described with reference to the flowchart shown in FIG. 7.

The line CCD scanner 14 previously sets a plurality of modes, such as "pre-scan preparatory state mode", "dark correction mode", "light correction mode", "pre-scan mode", and "fine scan mode", and respective states of various portions of the line CCD scanner 14 in each of the above-described modes are also previously set.

Figure 7:
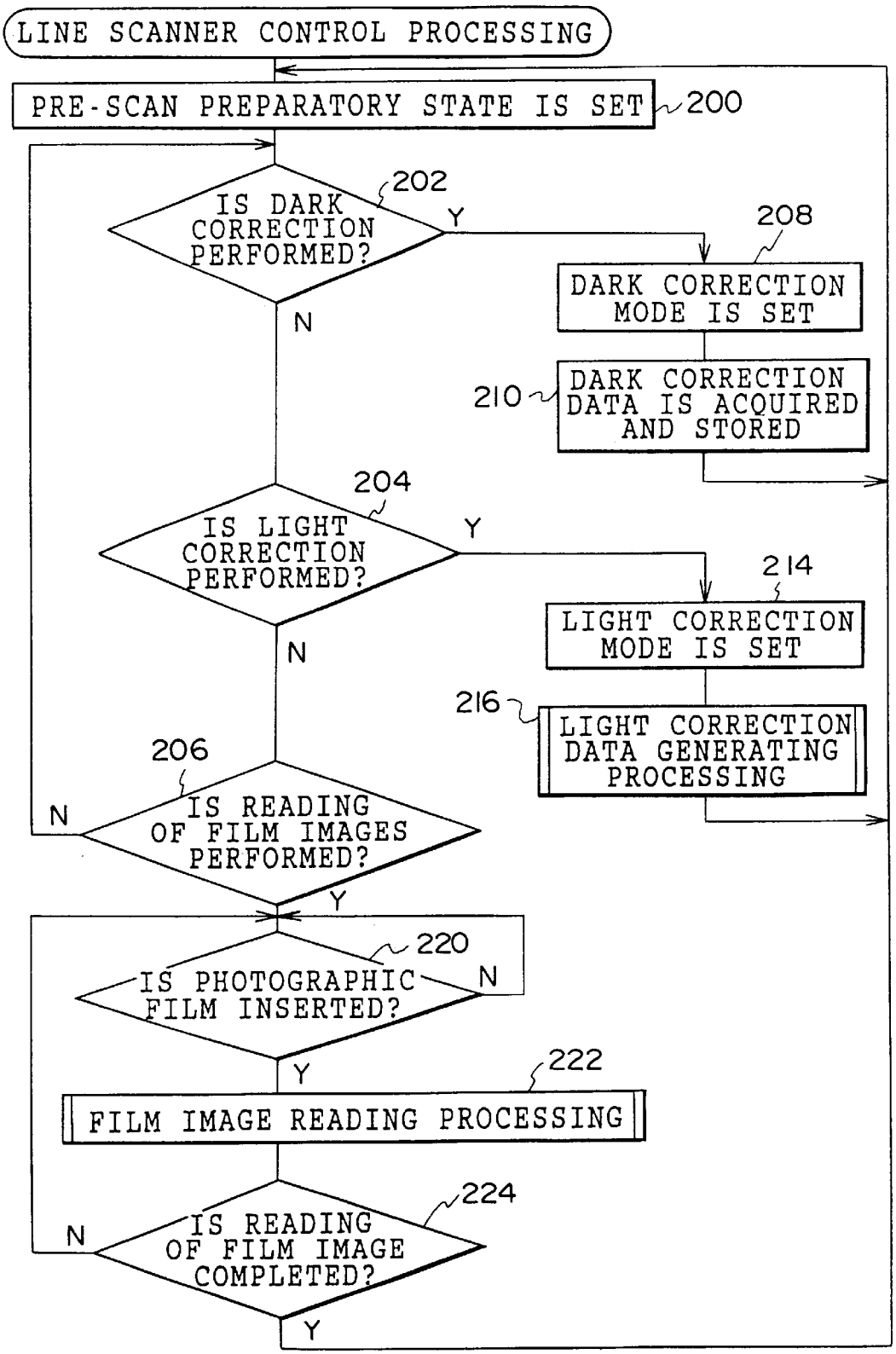
FIG. 7 is a flowchart which schematically shows line scanner control processing executed by a microprocessor of the line CCD scanner in the embodiment of the present invention.
Figure 10A:
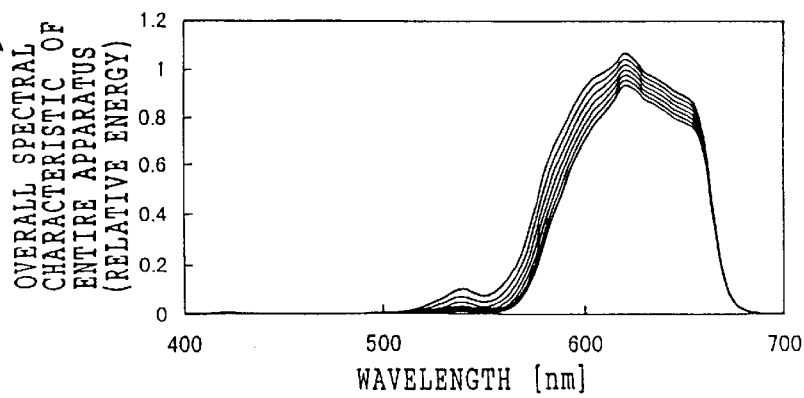
FIGS. 10A to 10D each show a graph which shows respective states of pixels at seven places of the line CCD, which the pixels having different sensitivities, when light correction data is acquired without using a color balance filter and without a photographic film being provided.
Figure 10B:
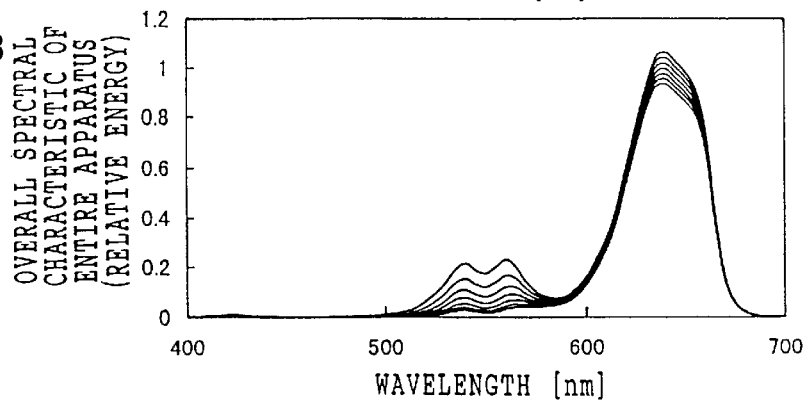
Figure 10C:
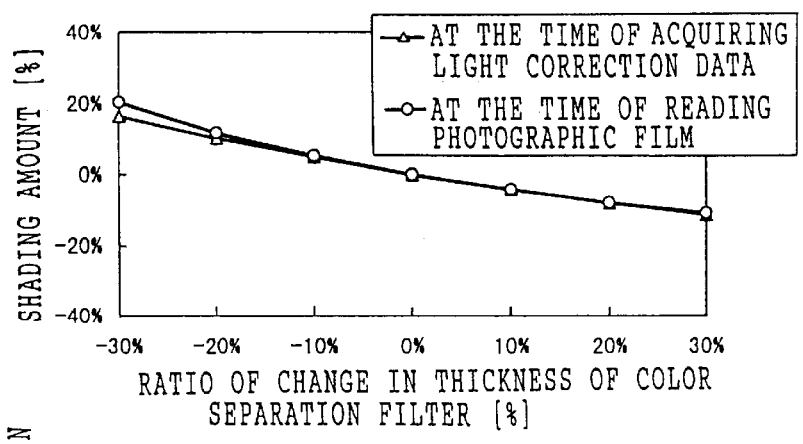
Figure 10D:
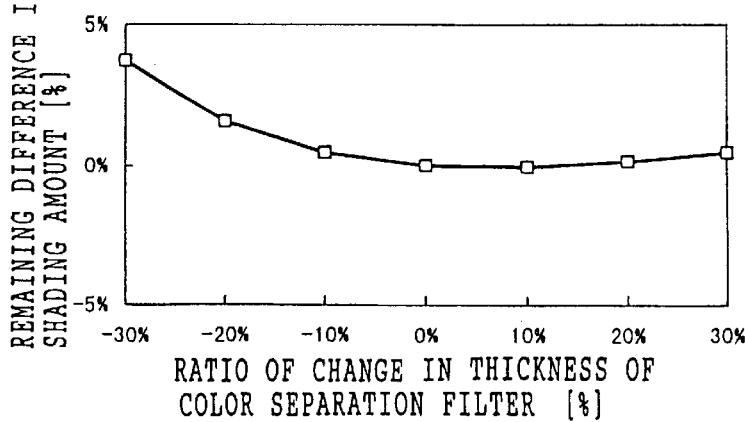
Figure 11A:
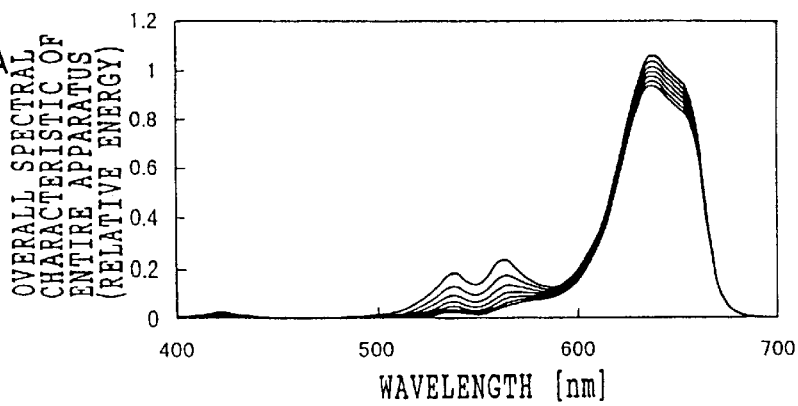
FIGS. 11A to 11D each show a graph which shows respective states of pixels at seven places of the line CCD, which pixels having different sensitivities, when light correction data is acquired using a color balance filter for a positive film but without a photographic film being provided.
Figure 11B:
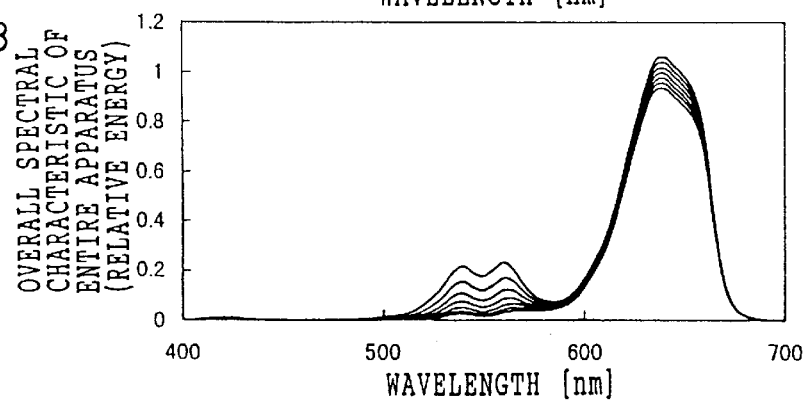
Figure 11C:
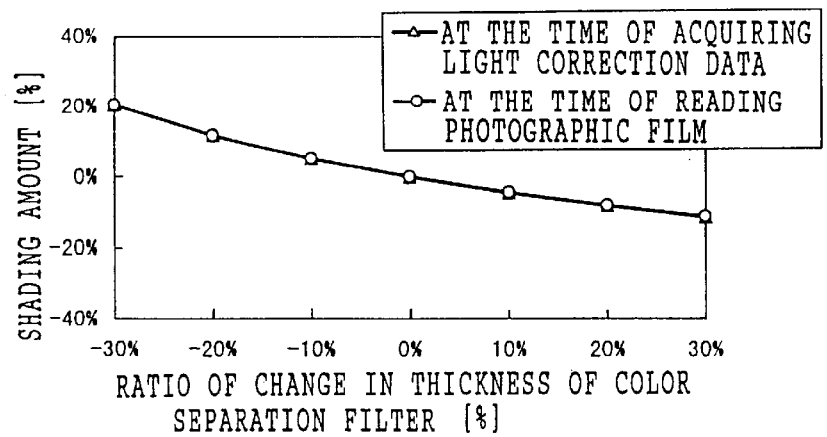
Figure 11D:
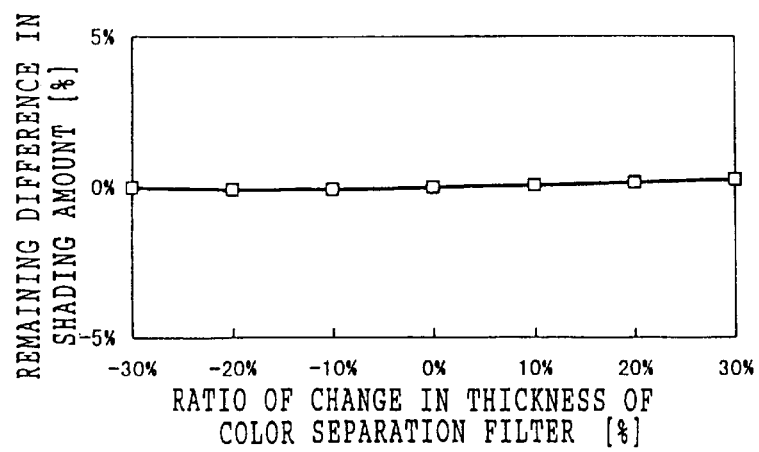

When a power source of the line CCD scanner 14 is turned on, the microprocessor 46 starts execution of the line scanner control processing shown in FIG. 7. First, in step 200, the process proceeds to the "pre-scan preparatory state mode", in which operations of various portions are controlled in accordance with a pre-scan preparatory state which is previously set as the pre-scan preparatory state mode for each film carrier.

Namely, the lamp 32 is lit by the lamp driver 53, the diaphragm 39 is moved to a predetermined preparatory position by the diaphragm driving motor 56, the lens diaphragm 51 is moved to a predetermined preparatory position by the lens diaphragm driving motor 62, and the CCD shutter 52 is moved to a completely open position by the shutter driving motor 64.

In the subsequent step 202, it is determined whether the dark correction by the line CCD 116 is to be performed. When the decision of step 202 is negative, the process proceeds to step 204, in which it is determined whether the light correction by the line CCD 116 is to be performed. When the decision of step 204 is also negative, the process proceeds to step 206, in which it is determined whether reading of a film image is to be performed. When the decision of step 206 is also negative, the process returns to step 202 and steps 202 to 206 are executed repeatedly.

The dark correction and the light correction are performed automatically: for example, periodically (for example, at the time of start-up in each day, or at regular time intervals), directly before the start-up of image reading, or at the time of alteration of device conditions (for example, at the time of changing the film carrier). When conditions for executing the dark correction are all present, the decision of step 202 is affirmative and the process proceeds to step 208. In step 208, the process proceeds to the "dark correction mode", in which operations of the various portions are controlled in accordance with the respective states of the various portions which are previously set as the "dark correction mode".

Namely, the CCD shutter 52 is moved to a completely closed position by the shutter driving motor 64. As a result, the line CCD 116 is brought into a state in which light is not made incident thereon.

In order to improve blockage of light from the line CCD 116, the lamp 32 may also be turned off by the lamp driver 53.

In the subsequent step 210, data to be outputted from the line CCD scanner 14 (data in which a signal corresponding to a dark output outputted from the line CCD 116 is subjected to A/D conversion) is stored as dark correction data of the line CCD 116.

When storage of the dark correction data is completed, the process returns to step 200, in which the process proceeds to the pre-scan preparatory mode. Subsequently, the above-described steps 202 to 206 are executed repeatedly.

On the other hand, when conditions for executing the light correction are all present, the decision of step 204 is affirmative and the process proceeds to step 214. In step 214, the process proceeds to the "light correction mode", in which operations of the various parts are controlled in accordance with the states of the various portions previously set as the "light correction mode".

Namely, the lamp 32 is lit by the lamp driver 53, the diaphragm 39 is moved to a lens stop-down position for reading by the diaphragm driving motor 56, the turret 36 is rotated by the turret driving motor 54 to a positive-film position (that is, a position where the positive-film balance filter 36P is located on the optical axis L), the mounting stand 47 and the lens unit 50 are slid and moved by the reading section driving motor 58 and the lens driving motor 60 so that the zoom magnification of the lens unit 50 becomes a reading magnification, the lens diaphragm 51 is moved to a completely open position by the lens diaphragm driving motor 62, and the CCD shutter 52 is moved to a completely open position by the shutter driving motor 64. At this time, an original such as the photographic film 22 is not set in the film carrier 38.

In the subsequent step 216, light correction data generating processing is executed. The light correction data generating processing will be hereinafter described with reference to the flowchart shown in FIG. 8.

First, in step 300, image data on one line outputted from the line CCD scanner 14 is stored in the RAM 68. In step 302, as an initialization, 1 is substituted for variable i.

In the subsequent step 304, light correction data ki corresponding to an i-th CCD cell of the line CCD 116 is calculated by the following expression (1):

$$ki = D\max / Di \quad (1)$$

wherein, Dmax indicates a maximum value of image data of each of the CCD cells outputted from the line CCD scanner 14, and Di indicates image data of the i-th CCD cell. Note that data of a singular point caused by a pixel defect (so-called white/black defects) in the line CCD 116 is not included.

In the subsequent step 306, light correction data ki is stored in a predetermined light correction data storage region of the RAM 68.

In step 308, it is determined whether the process of the above-described steps 304 and 306 has been completed for all of the CCD cells of the line CCD 116. When the decision of step 308 is negative, the process proceeds to step 310, in which the value of i is incremented by one. Subsequently, the process returns to step 304. When the decision of step 308 is affirmative, the light correction data generating processing ends. Namely, the process from step 304 to step 308 is executed repeatedly for all of the CCD cells of the line CCD 116, and thereafter, the light correction data generating processing ends.

When the light correction data generating processing ends, the process returns to step 200 (see FIG. 7), in which the process proceeds to the pre-scan preparatory state mode. Subsequently, the process of the steps 202 to 206 is executed repeatedly.

On the other hand, when an instruction for reading film images is given by an operator, the decision of step 206 is affirmative and the process proceeds to step 220.

In step 220, it is determined whether the photographic film 22 to be read has been inserted in the film carrier 38, and the process is placed in a waiting state until the decision of step 220 is affirmative. When a leading end of the photographic film 22 to be read is inserted in a photographic-film insertion opening (not shown) of the film carrier 38 and this state is detected by a leading-end detecting sensor (not shown), the decision of step 220 is affirmative and the process proceeds to step 222, in which film image reading processing shown in FIG. 9 is executed.

In step 400 shown in FIG. 9, the process proceeds to the "pre-scan mode", in which operations of the various portions are controlled in accordance with the respective states of the various portions previously set as the "pre-scan mode" so that pre-scan for the photographic film 22 is performed under a predetermined reading condition.

Namely, the lamp 32 is lit by the lamp driver 53, the diaphragm 39 is moved by the diaphragm driving motor 56 to a position at pre-scan, the mounting stand 47 and the lens unit 50 are slid and moved by the reading section driving motor 58 and the lens driving motor 60 so that the zoom magnification of the lens unit 50 becomes a reading magnification, the lens diaphragm 51 is moved to a completely open position by the lens diaphragm driving motor 62, and the CCD shutter 52 is moved to a completely open position by the shutter driving motor 64.

When the photographic film 22 to be read is a negative film, the turret 36 is rotated to a negative-film position by the turret driving motor 54. When the photographic film 22 to be read is a positive film, the turret 36 is rotated to a positive-film position.

With respect to the timing generator 74, the operation time of an electronic shutter of the line CCD 116 (that is, a reading cycle of the line CCD 116 (charge accumulation time)) is set at t, which is a minimum value of the operation time. Moreover, the speed at which the photographic film 22 is conveyed by the film carrier 38 is set as 5×v, which is a maximum value of the speed. Accordingly, pre-scan for the photographic film 22 is carried out at a high speed with a relatively coarse resolution and is completed in a short time.

In the subsequent step 402, pre-scan is started in such a manner that an instruction for conveying the photographic film 22 in a predetermined direction (the direction indicated by arrow C in FIG. 2) is given to the film carrier 38, the photographic film 22 conveyed at the maximum conveying speed (5×v) is read by the line CCD 116 at the shortest reading cycle (t), signals outputted from the line CCD 116 are sequentially subjected to A/D conversion and are further subjected to the dark correction and the light correction, and these corrected signals are sequentially outputted, as pre-scan data, to the image processing section 16. When the above-described light correction is performed, the light correction data stored in the light correction data generating processing shown in FIG. 8 is used.

In step 404, it is determined whether pre-scan has been performed to the end of the photographic film 22, and the process is placed in a waiting state until the decision of step 404 is affirmative.

During the pre-scan, in the image processing section 16, image data inputted from the line CCD scanner 14 is sequentially stored in a storage portion (not shown), and at the time when a predetermined amount of image data is stored, edge positions at both ends of a film image recorded on the photographic film 22 in the direction in which the photographic film 22 is conveyed (that is, ends of the film image at upstream and downstream sides) are each determined based on the stored image data.

The determination of the edge positions can be made, as proposed by the present inventors in Japanese Patent Application Laid-Open (JP-A) Nos. 8-304932, 8-304933, 8-304934, and 8-304935, by calculating, based on a density value for each pixel represented by pre-scan data, a density variation value along a longitudinal direction of the film for each pixel, adding respective density variation values along the longitudinal direction of the film for the pixels on each line along the transverse direction of the film, and comparing respective added values of every line. Further, when the photographic film 22 is an APS film, a region having a possibility of the edges existing from the position where perforations are formed is set as a search range, and by searching for the edges in the search range, the time required for determining the edge position can also be shortened.

In the image processing section 16, based on the determined edge position, the frame position of a film image is determined so as to correspond to the position of perforations, and the determined frame position is stored in the storage portion (not shown), and further, based on the frame position, image data in a region with the film image recorded thereon is cut out from the stored image data and is stored in the storage portion (not shown).

When pre-scan has been completed to the end of the photographic film 22 (when the decision of step 404 is affirmative), in step 406, predetermined image characteristic amounts of a film image are calculated from the pre-scan image data stored in the storage portion (not shown) by the image processing section 16 at pre-scan. The predetermined image characteristic amounts also include a color balance value of the film image (specifically, a ratio of a minimum density value (or a maximum luminance value) for each of component colors of the film image).

In step 406, based on the calculated image characteristic amounts, the kind of the film image (size and density level) and a processing condition for image processing for the fine scan image data are set by calculation.

When a 135-size photographic film is used as the photographic film 22 to be read, the size of a film image (in this case, the frame size of a film image) can be determined based, for example, whether the density or color tint of a predetermined portion, the predetermined portion being provided within an image recording range in a standard-size film image and the predetermined portion being provided outside the image recording range in a panorama-size film image, corresponds to that of an unexposed portion (in a negative film, a white region).

Further, as disclosed in JP-A Nos. 8-304932, 8-304933, 8-304934, and 8-304935, the size (aspect ratio) of a film image may be determined by, based on respective density values of pixels represented by image data at pre-scan, calculating a density variation value along the transverse direction of the film for each pixel, adding the respective density variation values, along the transverse direction of the film, of the pixels by lines along the longitudinal direction of the film, and further, comparing added values by lines, or may be determined based on a ratio of an image, which is a binary image provided by obtaining a threshold value from a density histogram, existing in each region of an image, or further, may be determined based on the dispersion and average value of density variation values in the above-described predetermined portion. Alternatively, the size of a film image may also be determined using a combination of the above-described methods.

When an APS film is used as the photographic film 22 to be read, the size of a film image (in this case, a print size) can be determined by reading a print size magnetically recorded, as data, on a magnetic layer of the APS film.

The density level of a film image can be determined based on the density classification of low density, normal density, high density, ultra high density, and the like by making a comparison of, for example, average density, maximum density, or minimum density with a predetermined value. Further, as the processing condition for image processing, for example, an enlargement/reduction ratio of an image, a processing condition for image processing for hyper-tone or hyper-sharpness (specifically, compression of gradation to an ultra low frequency brightness component of an image, or a gain (degree of highlighting) for a high frequency component or an intermediate frequency component of an image), and a gradation conversion condition are calculated.

When setting of the size and processing condition for image processing for each of all frame images is completed as described above, in step 408, an instruction for conveying the photographic film 22 in a direction opposite to the above-described predetermined direction (that is, a direction opposite to that indicated by arrow C in FIG. 2) is given to the film carrier 38 so as to allow fine scan of a film image.

In the subsequent step 410, operation of the various portions of the line CCD scanner 14 is controlled so that fine scan for the film image is performed under a reading condition suitable for the kind of a film image to be subsequently subjected to fine scan.

First, the size of the film image to be subsequently subjected to fine scan (in this case, a film image that reaches the reading position first when the photographic film 22 is conveyed in the direction opposite to the predetermined direction) is fetched, and a determination as to the size of the film image is made, and further, setting of a fine scan mode corresponding to the determined size is performed. For example, when the size is determined as a "high density frame", operation of the various portions is controlled in accordance with respective states of the various portions previously set as a fine scan mode for a high density frame.

Namely, the lamp 32 is lit, the diaphragm 39 is moved to a position at fine scan for a high density frame, the mounting stand 47 and the lens unit 50 are slid and moved so that the zoom magnification of the lens unit 50 becomes a reading magnification, and the lens diaphragm 51 and the CCD shutter 52 are each moved to the completely open position.

When the photographic film 22 to be read is a negative film, the turret 36 is rotated to a negative-film position. When the photographic film 22 to be read is a positive film, the turret 36 is rotated to a positive-film position.

With respect to the timing generator 74, the operation time (reading cycle) of the electronic shutter of the line CCD 116 is set at t, and the speed at which the photographic film 22 is conveyed by the film carrier 38 is set at v. The amount of light transmitted through a high-density film image is small, and in order that the high-density film image is read with high accuracy in a high dynamic range, the diaphragm 39 at fine scan for a high-density frame is located in a position that is nearly a completely open position.

In the subsequent step 412, based on a frame position stored in the storage portion (not shown) of the image processing section 16 at pre-scan, a determination is made as to whether an edge of the film image to be subsequently subjected to fine scan has reached the reading position of the line CCD 116 (a position on the optical axis). The process is placed in a waiting state until the decision of step 412 is affirmative. When the decision of step 412 is affirmative, the process proceeds to step 414, in which fine scan is performed in such a manner that the film image which has reached the reading position is read by the line CCD 116, signals outputted from the line CCD 116 are sequentially subjected to A/D conversion and further subjected to dark correction and light correction, and then are sequentially outputted, as fine scan image data, to the image processing section 16. As a result, fine scan for the film image is performed under an optimum reading condition for every size of the film images. In the light correction performed in this case as well, light correction data stored in the light correction data generating processing shown in FIG. 8 is used.

The fine scan image data outputted from the line CCD scanner 14 to the image processing section 16 is subjected to image processing in the image processing section 16 under the processing condition previously calculated and stored, and is further outputted to a laser printer section (not shown) or outputted outside as an image file.

When fine scan for a single film image is completed, the process proceeds to step 416, in which it is determined whether fine scan for all the film images recorded on the photographic film 22 to be read has been completed. When the decision of step 416 is negative, the process returns to step 410 and the process from step 410 to steep 416 is executed repeatedly. In the steps 410 to 416, fine scan for each film image is performed under an optimum reading condition corresponding to the size of each film image recorded on the photographic film 22 to be read. When the decision of step 416 is affirmative, the image reading processing ends.

When the film image reading processing ends, in the subsequent step 224 (see FIG. 7), it is determined whether reading of film images ends. In a case in which reading of the film images recorded on the photographic film 22 to be subsequently read is successively performed, when the decision of step 224 is negative and the process returns to step 220, in which the photographic film 22 to be subsequently read is inserted in the film carrier 38 (when the decision of step 220 is affirmative), the film image reading processing is performed again. Further, when the decision of step 224 is affirmative, the process returns to step 200, in which the process proceeds to the pre-scan preparatory state mode, and thereafter, the process from the above-described steps 202 to 206 is executed repeatedly.

As described above in detail, the image reading apparatus according to the present embodiment is provided with a balance filter suitable for a negative film and a balance filter suitable for a positive film and generates light correction data which allows accurate light correction both for a negative film and for a positive film based on image data obtained using the balance filter suitable for a positive film. Accordingly, a complicated operation required when a film image for adjustment having a constant density is used during generation of light correction data is not necessary, and even when spaces among image frames on a photographic film are narrow, the light correction data can reliably be generated.

Further, respective balance filters for a positive film and for a negative film are, generally, provided in advance in an image reading apparatus. In this case, using the balance filter for a positive film during generation of the light correction data does not result in increased cost of the apparatus.

In the present embodiment, there was described a case in which the negative-film balance filter 36N and the positive-film balance filter 36P are provided for the singular turret 36 and only one of these balance filters 36N and 36P is inserted and located on the optical axis L in accordance with the operating state. However, the present invention is not limited to the same, and for example, a structure in which balance filters of different characteristics are provided so as to be inserted and located on the optical axis L by different members, and at least one of the balance filters is inserted and positioned on the optical axis L in accordance with the operating state may be employed. In this case, as compared with the present embodiment, many more kinds (in this case, four kinds) of filter characteristics can be achieved.

Further, in the present embodiment, there is described a case in which light correction data is generated based on image data acquired only once. However, the present invention is not limited to the same, and a structure in which image data is acquired a plurality of times, and in which based on an arithmetic means value of identical pixels of the plurality of image data, the light correction data for each pixel is generated may also be adopted. In this case, as compared with the present embodiment, highly accurate light correction data which is not easily susceptible to noise or the like can be generated.

Moreover, in the present embodiment, there was described a case in which the line CCD is used as the image sensor, but the present invention is not limited to the same. An area CCD, or a photoelectric transfer element other than a CCD may also be used.

According to the image reading apparatus relating to the first aspect of the present invention, both at the time of generation of light correction data and at the time of operation for light correction, the color balance of illuminating light emitted from the light source is adjusted so that respective outputs of channels of the image sensor become substantially uniform. For this reason, the following effects can be obtained: respective states of the color balance of light emitted from the light source both at the time of generation of light correction data and at the time of operation for light correction can be made substantially uniform; a complicated operation required when using a film image for adjustment of a constant density is used to generate light correction data becomes unnecessary; and even when a space between adjacent image frames on the photosensitive material is narrow, the light correction data can reliably be generated.

Further, according to the image reading apparatus relating to the second aspect of the present invention and also according to the image reading method relating to the fourth aspect of the present invention, the color balance filter suitable for a negative film and the color balance filter suitable for a positive film are provided, and based on data acquired by reading the color balance filter suitable for a positive film, light correction data which allows accurate light correction for both a negative film and a positive film is generated. Accordingly, the following effects can be obtained: a complicated operation required when a film image for adjustment of a constant density is used at the time of generation of light correction data becomes unnecessary; and even when spaces between film images on the photosensitive material are each narrow, the light correction data can reliably be generated with accuracy.

Moreover, according to the image reading apparatus relating to the third aspect of the present invention and also according to the image reading method relating to the fifth aspect of the present invention, the light correction data in the first and fourth aspects of the present invention is generated based on an arithmetic mean value of data of identical pixels when the positive-film color balance filter is read by the image sensor a plurality of times in a state in which the photosensitive material is not present. Accordingly, the present invention has an effect in that light correction data can be made highly accurate and not easily susceptible to noise or the like.

What is claimed is:

1. An image reading apparatus comprising:
   a light source which emits light for illuminating a photosensitive material;
   an image sensor which reads an image recorded on the photosensitive material in a state of being separated into a plurality of pixels, and outputs the read image as image data; and
   adjusting means for adjusting the color balance of illuminating light emitted from said light source so that respective outputs of channels of said image sensor become substantially uniform both at the time of generation of light correction data and at the time of operation for light correction.

2. The apparatus of claim 1, wherein the adjusting means further determines corrective data using only data read when a positive-film color balance filter is disposed at the light source.

3. The apparatus of claim 1, further comprising a filter section including a negative-film color balance filter suitable for a negative film and a positive-film color balance filter suitable for a positive film, and disposed between said light source and said image sensor, and wherein at least one of said negative-film color balance filter and said positive-film color balance filter is used for both generation of light correction data during a light correction operation and during a reading operation.

4. An image reading method comprising the steps of:
   illuminating a photosensitive material with light emitted from a light source;
   reading an image recorded on the photosensitive material in a state of being separated into a plurality of pixels and outputting the read image as image data by an image sensor; and
   adjusting the color balance of illuminating light emitted from said light source so that respective outputs of channels of said image sensor become substantially uniform both at the time of generation of light correction data and at the time of operation for light correction.

5. The method of claim 4, wherein adjusting the color balance includes determining corrective data using only data read when a positive-film color balance filter is disposed at the light source.

6. The method of claim 4 further comprising disposing one of a negative-film color balance filter suitable for a negative film and a positive-film color balance filter suitable for a positive film between said light source and said image sensor during an operation for generating light correction data and also during an operation for reading image data.

7. An image reading apparatus comprising:
   a light source which emits light for illuminating a photosensitive material;
   an image sensor which reads an image recorded on the photosensitive material in a state of being separated into a plurality of pixels, and outputs the read image as image data;
   a filter section including a negative-film color balance filter suitable for a negative film and a positive-film color balance filter suitable for a positive film, and disposed between said light source and said-image sensor;
   light correction data generating means which generates light correction data based on data obtained by reading the positive-film color balance filter by said image sensor in a state without photosensitive material; and
   correction means which effects light correction for image data of the photosensitive material to be read based on the light correction data and wherein one of the negative-film color balance filter and the positive-film color balance filter is used during light correction.

8. An image reading apparatus comprising:
   a light source which emits light for illuminating a photosensitive material;
   an image sensor which reads an image recorded on the photosensitive material in a state of being separated into a plurality of pixels, and outputs the read image as image data;
   a filter section including a negative-film color balance filter suitable for a negative film and a positive-film color balance filter suitable for a positive film, and disposed between said light source and said image sensor;

light correction data generating means which generates light correction data based on data obtained by reading the positive-film color balance filter by said image sensor in a state without photosensitive material; and correction means which effect light correction for image data of the photosensitive material to be read based on the light correction data, wherein said light correction data generating means generates the light correction data based on an arithmetic mean value of data of identical pixels when the positive-film color balance filter is read by said image sensor a plurality of times in a state without photosensitive material.

9. An image reading method according to claim 8, wherein the light correction data is generated based on an arithmetic mean value of data of identical pixels when the positive-film color balance filter is read by the image sensor a plurality of times without photosensitive material.

10. An image reading method comprising the steps of:

generating in advance light correction data based on data obtained when, in a filter section which is disposed between a light source that emits light for illuminating a photosensitive material in a state of being separated into a plurality of pixels and outputs the read image as image data and which includes a negative-film color balance filter suitable for a negative film and a positive-film color balance filter suitable for a positive film, the positive-film color balance filter suitable for a positive film is read by the image sensor in a state without photosensitive material; and based on the light correction data, effecting light correction for image data of a photosensitive material to be read, wherein the light correction data is based on an arithmetic mean value of data of identical pixels when the positive-film color balance filter is read by said image sensor a plurality of times in a state without photosensitive material.

11. An image reading method comprising the steps of:

generating in advance light correction data based on data obtained when, in a filter section which is disposed between a light source that emits light for illuminating a photosensitive material in a state of being separated into a plurality of pixels and outputs the read image as image data and which includes a negative-film color balance filter suitable for a negative film and a positive-film color balance filter suitable for a positive film, the positive-film color balance filter suitable for a positive film is read by the image sensor in a state without photosensitive material, said light correction data being determined solely from reading data when the positive film color balance filter is disposed at said light source; and based on the light correction data, effecting light correction for image data of a photosensitive material to be read.

12. The method of claim 11, wherein the light correction data is determined solely from reading data of the positive-film color balance even when the photosensitive material to be read comprises a negative film.

13. The method of claim 11, wherein at least one of said negative-film color balance filter suitable for a negative film and said positive-film color balance filter suitable for a positive film is used when said photosensitive material is read.

* * * * *